Feb. 22, 1966  R. E. GERHARDT ETAL  3,235,925
CLAMPING BANDS
Filed Jan. 23, 1964  2 Sheets-Sheet 1

INVENTORS
RICHARD E. GERHARDT
RAYMOND L. THURSTON
BY Ely, Pearne & Gordon
ATTORNEYS

INVENTORS
RICHARD E. GERHARDT
RAYMOND L. THURSTON
BY

ATTORNEYS

United States Patent Office 3,235,925
Patented Feb. 22, 1966

3,235,925
CLAMPING BANDS
Richard E. Gerhardt and Raymond L. Thurston, Oakland County, Mich., assignors to Republic Industrial Corporation, New York, N.Y., a corporation of Delaware
Filed Jan. 23, 1964, Ser. No. 339,721
3 Claims. (Cl. 24—23)

The present invention relates to clamping bands formed of flat strips of resilient metal having a portion thereof arranged in a clamping formation for exerting a continuous tension on the band when in use and having hook shaped portions at one end of the band which are engageable with openings at the other end of the band.

The clamping bands according to this invention may be employed, for example, for tightly embracing a hose and exerting a circumferential and inward radial pressure for holding a hose tightly onto a rigid tubular member or nipple to provide a substantially permanent connection.

According to prior art practices, clamping bands have been provided for clamping a hose onto a tubular member. One such clamping band is set forth in the patent to Oetiker, Patent No. 2,847,742. The clamping band of Oetiker comprises a two-piece assembly which includes a perforated metal band which is bent to form an open ring adapted to be slipped onto a hose. The second piece is a relatively short and rigid metal band bent to have a U-shaped, compressible, central body portion and to have a claw or hook at each end. While the assembly of Oetiker provides a satisfactory union between a hose and a rigid tubular member, and advantageously, can be easily adapted to clamp any diameter hose, the two-piece assembly is cumbersome and difficult to position on the hose.

Another clamping band is set forth in the patent to Thurston et al., Patent No. 3,106,757. The Thurston et al. patent sets forth a one-piece clamping ring in the form of a circular or cylindrical band. The band is provided with a keystone-shaped loop which may be crimped to tighten the band about a hose. Although the clamping band according to Thurston et al., overcomes many of the prior art problems, the closed cylindrical shape of the band prevents the band from being easily attached to the hose without having one end or the other end of the hose free so that it can be slipped axially over the hose to its clamping position thereon. The cylindrical band of Thurston et al., moreover, must be manufactured to fit hoses having a standard diameter.

It is an object of this invention to provide a clamping band that overcomes many of the problems in the prior art.

It is a more specific object of this invention to provide a one-piece open clamping band having a preformed loop or off-set portion and opposite end-joining means which may be partially formed in a preliminary step, so that the band may be locked closed about a hose and then tightened and shaped to maintain a permanent holding position, using a simple tool to perform a single, final shaping and tightening step; and to provide a one-piece band that may be bent and clamped around a hose having any of a wide range of diameters, without removing either end of the hose from its fitting.

It is a further object of the invention to provide a clamping band which, although having a portion of its length perforated at intervals for adjustable engagement with a mating hook, is easily bent smoothly by hand to a generally circular form without kinking and thereby weakening the band.

It is a further object of this invention to provide a one-piece clamping band that may be inexpensively stamped from sheet metal.

Other objects of the invention will become apparent from the following detailed description of the following illustrative embodiments and from the accompanying drawings.

Figure 1:
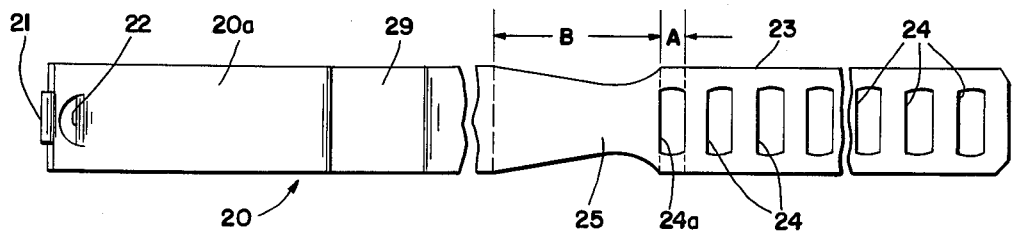
FIGURE 1 is a plan view of a clamping band according to one aspect of this invention.

Referring now to the drawings, and particularly to FIGURES 1–7, a clamping band 20 is illustrated. The clamping band 20 may be stamped from a thin sheet of steel or other material having like properties. That is, the band should have good tensile strength and be resilient while being capable of retaining a permanent set when bent to the desired shape. One end of the band 20 is provided with a pair of hooks 21 and 22 struck out of the body of the band. The hook 21 is an outwardly bent end portion of the band 20 and the hook 22 is an outwardly punched portion of the band 20. The opposite end of the band 20 includes a perforated portion 23 provided with a series of rectangular apertures 24. A portion of the band 20 adjacent to the perforated portion 23 is gradually tapered inwardly to provide a narrow neck portion 25.

The clamping band 20 may be initially bent by hand into a generally circular form so that it may be more easily wrapped tightly around a hose, or the band 20 may be bent as it is wrapped on the hose or article to be clamped. During this bending operation, the bending stresses tend to concentrate at the apertures 24 and particularly at the aperture 24a which is adjacent to the unperforated portion of the body of the band 20. The inwardly tapered neck portion of the band 20, however, minimizes the concentration of bending stresses at the aperture 24a in a narrow zone A by distributing these stresses more uniformly over a relatively large zone B. It should be appreciated that the band 20 is the most difficult to bend in zones having the greatest cross-sectional area, and, conversely, is the most easily bent in those zones having a smaller cross-sectional area. The zone B, therefore, provides a zone of gradual demarcation between longitudinally spaced portions of the band 20 that have substantially different bending characteristics.

Figures 3, 4, 5:
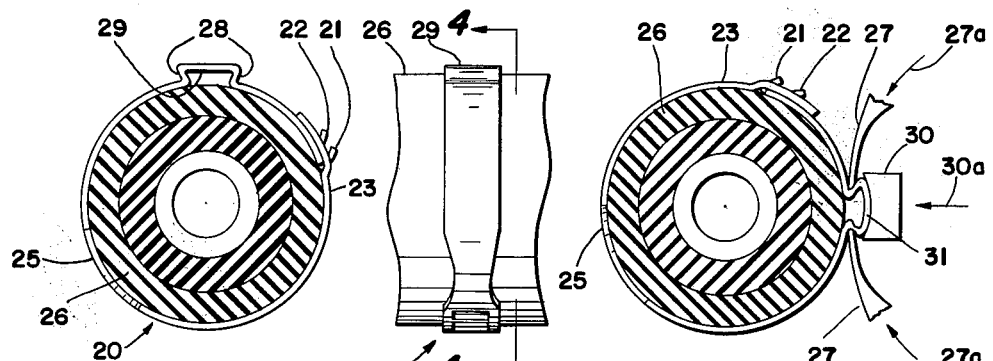
FIGURE 3 is a side elevation of the clamping band preassembled but not yet finally tightened on a hose.
FIGURE 4 is a sectional view of the assembly of FIGURE 3, the plane of the section being indicated by the line 4—4 in FIGURE 3.
FIGURE 5 is a sectional view similar to FIGURE 4, but showing the band being clamped onto its hose by means of a clamping tool of which only fragments are shown.
Figures 6, 7:
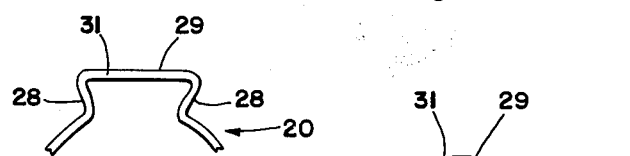
FIGURE 6 is a fragmentary enlarged view of the band showing the keystone-shaped loop of the band before crimping and tightening.
FIGURE 7 is a fragmentary enlarged view like FIGURE 6, but showing the final, crimped configuration of the clamping loop.

As may be seen in FIGURES 3, 4, and 5, the band 20 is wrapped tightly around a hose 26, and the hooks 21 and 22 are respectively engaged by a pair of adjacent apertures 24 so that the band 20 will be temporarily held snugly on the hose. After the band 20 is so positioned, any excess length of its apertured end may be cut off, and a pair of pincher jaws 27 of a plier-like tool may engage the clamping band at the inner corners between outwardly flaring sides 28 of a loop 29 and the circular body of the bent clamping band (FIGURE 5). Simultaneously, a holding force is applied to a tool block 30 engaging a bridge portion 31 of the offset 29 in the direction of the arrow 30a, assuring that the diverging sides of the offset will assume the more sharply inturned angular position shown in FIGURES 5 and 7, while preventing the bridge portion 31 from buckling or bowing outwardly to an excessive degree.

The configuration and tightening action of the loop or offset 29 is described in more detail in the above-mentioned patent to Thurston et al.

The pincher jaws 27 may comprise the jaws of a specially constructed plier-like tool equipped with an anvil or back-up block 30. This block 30 preferably has a slight, relative inward movement as the sides and inner corners of the loop are brought close together in their final clamping position. The clamping forces applied are concentrated at the inner corners of the sides 28 of the loop as the band is tightened around the hose by moving the jaws 27 in the direction of the arrows 27a. This closing movement of the inner ends of these jaws 27 may simultaneously cause the block 30 to move inwardly toward the clamping band and hose. This block 30 may have a slight curvature at the face which engages the bridge portion 31. When the clamping is completed and the resiliency of the hose exerts both radial and circumferential forces, the sides 28 of the loop 29 will be put under compression with a tendency to spread slightly and thus flatten any slight arch in the bridge portion 31, as indicated in phantom outline in FIGURE 7.

Figure 2:
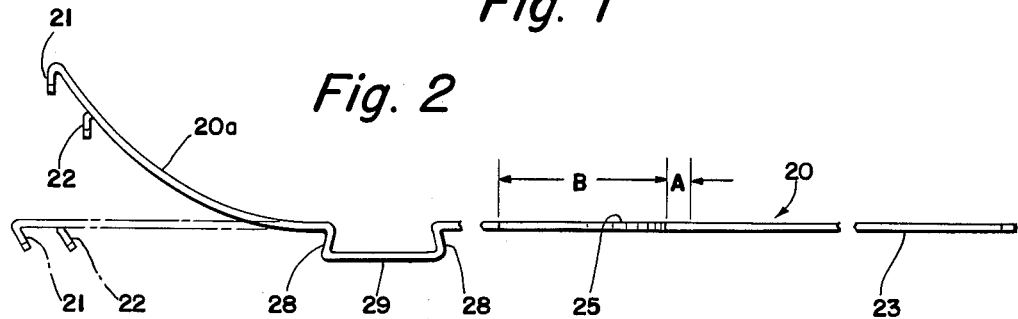
FIGURE 2 is an elevational view of the clamping band shown in FIGURE 1, and showing one end of the band in a partially bent position for preassembling the band on a hose.

In some instances it may be desirable to mechanically preform a portion 20a of the band 20 arcuately during the manufacture of the band, as is shown in solid outline in FIGURE 2. This is particularly true in cases where the loop 29 is formed on the band 20 at a location that is closely adjacent to the end of the band that is provided with the hooks 21 and 22, since the portion 20a would be more difficult to bend uniformly by hand.

Figure 8:
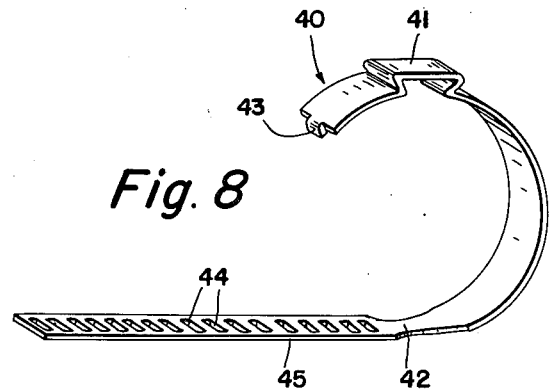
FIGURE 8 is a perspective view of a clamping band according to a further aspect of this invention, and showing that clamping band in a partially bent position.
Figure 9:
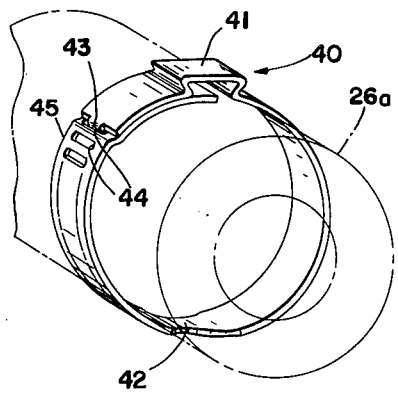
FIGURE 9 is a perspective view of the clamping band of FIGURE 8, and showing that band in a preassembled position on a hose.

Referring now to FIGURES 8 and 9, a clamping band 40 is illustrated. The clamping band 40 includes a loop 41 which is similar to the previously described loop 29 and further includes a neck portion 42 which is similar to the previously described neck portion 25. One end of the clamping band 40 is provided with a single, inwardly turned hook 43 which engages one of a plurality of apertures 44 in a perforated end portion 45 of the band 40.

As the clamping band 40 is bent by hand around a hose 26a, the bending stresses which would otherwise concentrate at the apertures 44 are distributed along the neck portion 42 and a smooth walled cylinder is easily formed. The hook 43 overlaps the perforated portion 45 and engages an aperture 44 as may be seen in FIGURE 9. According to this aspect of the invention, the perforated portion 45 does not interfere with the loop 41, and the perforated portion does not have to be bent back or cut off prior to crimping the loop 41.

Figure 10:
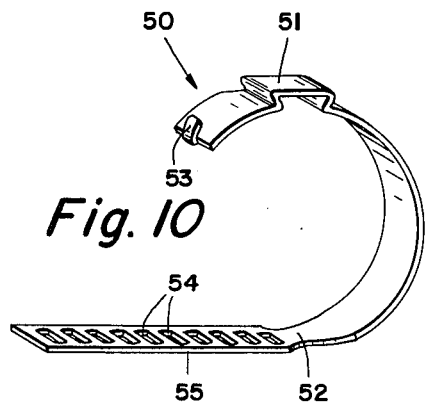
FIGURE 10 is a perspective view of a clamping band according to a further aspect of this invention, and showing that clamping band in a partially bent position.
Figure 11:
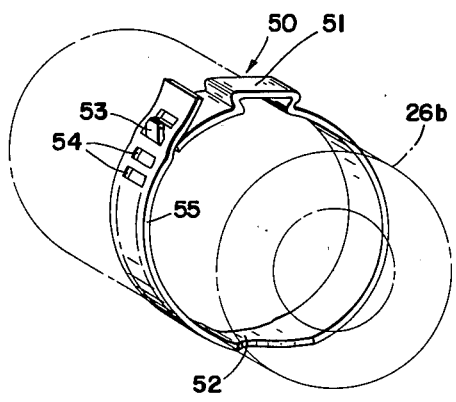
FIGURE 11 is a perspective view of the clamping band of FIGURE 10, and showing that clamping band in a preassembled position on a hose.

A clamping band 50, according to a further aspect of this invention, is illustrated in FIGURES 10 and 11. The clamping band 50 includes a loop 51, which is similar to the previously described loop 29, and further includes a single, outwardly turned hook 53 at one end of the band 50. A perforated portion 55 is provided at one end of the band 50 and the perforated portion 55 is provided with a plurality of apertures 54. A neck portion 52 is provided adjacent the perforated portion 55 to distribute the bending stresses along a relatively large zone.

As with the band of FIGURES 1–7, the clamping band 50 is bent by hand around a hose 26b to form a smooth walled cylinder as illustrated in FIGURE 11. The single hook 53 engages an aperture 54 on the perforated portion 55, as may also be seen in FIGURE 11, whereupon an excess length of the perforated end of the band may be cut-off as indicated.

Figure 12:
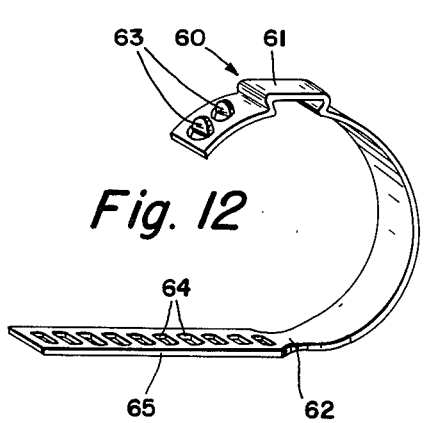
FIGURE 12 is a perspective view of a clamping band according to a further aspect of this invention, and showing that clamping band in a partially bent position.
Figure 13:
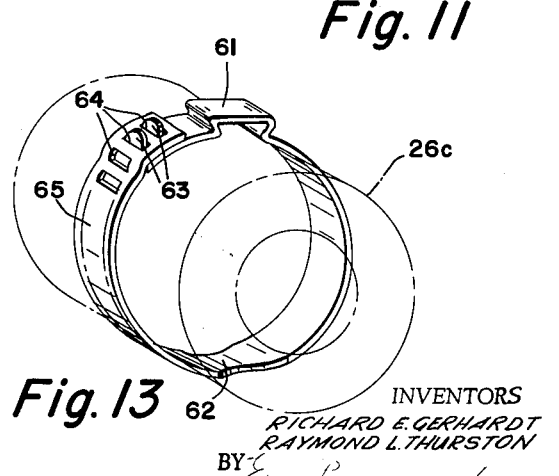
FIGURE 13 is a perspective view of the clamping band of FIGURE 12, and showing that band in a preassembled position on a hose.

Referring now to FIGURES 12 and 13, a clamping band 60 is illustrated. The clamping band 60 includes a loop 61 which is similar to the previously described loop 29. The clamping band 60 is provided with a neck portion 62 and is further provided with a pair of outwardly turned hooks 63, both of which are punched outwardly from the body of the clamping band 60 adjacent one end thereof. The manufacture of the band 60 is simplified by punching both of the hooks 63 from the body of the band, since it permits a straight cut off at the end of the band and, also, thereby saves material. A perforated portion 65 is provided at the other end of the band 60, and the perforated portion 65 is provided with a plurality of apertures 64. The band 60 is positioned about a hose and locked and clamped thereon in the same manner as the band of FIGURES 1–7, as indicated in FIGURE 13.

The use of two hooks at one end of a band, as is illustrated in FIGURES 1 through 5, 12 and 13, greatly increases the holding power of an assembled clamping band. It should be appreciated that more than two hooks may be employed, if desired.

The scope of the invention is not to be limited to the details of the embodiments disclosed above, but is to be defined by the claims set forth below.

What is claimed is:

1. A clamping band comprising a strip of metal, a first portion of the length of said strip having a substantially uniform width and cross-sectional area, a hook portion at the free end of said first portion, the other end of said strip comprising a second portion of the length of said strip of substantially the same width as said first portion and having a plurality of apertures engageable by said hook portion when said strip is bent around an article to be clamped, said apertures providing zones of cross-sectional area substantially less than that of said first portion, said strip having a zone between said first and second portions that gradually decreases in cross-sectional area from the uniform cross-sectional area of said first portion to a region of substantially less cross-sectional area adjacent the apertures in said second portion.

2. A clamping band comprising a strip of metal, a first portion of the length of said strip having a substantially uniform width and cross-sectional area and having a deformable clamping and tensioning loop formed therein, a hook portion at the free end of said first portion, the other end of said strip comprising a second portion of the length of said strip of substantially the same width as said first portion and having a plurality of apertures engageable by said hook portion when said strip is bent around an article to be clamped, said apertures providing zones of cross-sectional area substantially less than that of said first portion, said strip having a zone between said first and second portions that gradually decreases in cross-sectional area from the uniform cross-sectional area of said first portion to a region of substantially less cross-sectional area adjacent the apertures in said second portion.

3. A clamping band comprising a strip of metal of uniform thickness, a first portion of the length of said strip having a substantially uniform width and cross-sectional area and having a deformable clamping and tensioning loop formed therein, a hook portion at the free end of said first portion, the other end of said strip comprising a second portion of the length of said strip of substantially the same width as said first portion and having a plurality of apertures engageable by said hook portion when said strip is bent around an article to be clamped, said apertures providing zones of cross-sectional area substantially less than that of said first portion, said strip having a zone between said first and second portions that gradually decreases in width and cross-sectional area from the uniform cross-sectional area of said first portion to a region of substantially less width and cross-sectional area adjacent the apertures in said second portion.

References Cited by the Examiner
UNITED STATES PATENTS

| 1,615,144 | 1/1927 | Singley | 24—20 |
| 1,705,895 | 3/1929 | Blair | 24—20 |
| 2,113,443 | 4/1938 | Eggerss | 24—20 |
| 3,020,631 | 2/1962 | Kennedy | 24—20 |
| 3,027,128 | 3/1962 | Liberty | 24—20 |
| 3,082,498 | 3/1963 | Oetiker | 24—20 |

FOREIGN PATENTS

| 338,640 | 5/1959 | Switzerland. |

WILLIAM FELDMAN, *Primary Examiner.*
DONLEY J. STOCKING, *Examiner.*